US012626548B2

(12) United States Patent
Trivedi et al.

(10) Patent No.: US 12,626,548 B2
(45) Date of Patent: May 12, 2026

(54) DATA COLLECTION FOR VEHICLE SENSOR DATA

(71) Applicant: Atieva, Inc., Newark, CA (US)

(72) Inventors: Amiya Trivedi, Cupertino, CA (US); Venkatesh Lakshmikanthan, Newark, CA (US); Raj Umashankar Gupta, San Jose, CA (US); Alok Kumar Sinha, Fremont, CA (US)

(73) Assignee: Atieva, Inc., Newark, CA (US)

( * ) Notice: Subject to any disclaimer, the term of this patent is extended or adjusted under 35 U.S.C. 154(b) by 82 days.

(21) Appl. No.: 18/705,345

(22) PCT Filed: Oct. 27, 2022

(86) PCT No.: PCT/US2022/078813
§ 371 (c)(1),
(2) Date: Apr. 26, 2024

(87) PCT Pub. No.: WO2023/077022
PCT Pub. Date: May 4, 2023

(65) Prior Publication Data
US 2024/0420523 A1     Dec. 19, 2024

Related U.S. Application Data

(60) Provisional application No. 63/263,308, filed on Oct. 29, 2021.

(51) Int. Cl.
*G07C 5/00*     (2006.01)
*G06F 3/06*     (2006.01)
(Continued)

(52) U.S. Cl.
CPC ........... *G07C 5/085* (2013.01); *G06F 3/0608* (2013.01); *G06F 3/0683* (2013.01); *G06F 16/00* (2019.01); *H04L 67/12* (2013.01)

(58) Field of Classification Search
CPC ........ G07C 5/085; G07C 5/0866; H04L 67/12
See application file for complete search history.

(56) References Cited

U.S. PATENT DOCUMENTS 11,094,148 B2 *   8/2021   Sato ........................ G07C 5/085
2009/0058995 A1 *  3/2009   Yamashita ...................... 348/61
(Continued)

FOREIGN PATENT DOCUMENTS

DE        102008010628 A1     8/2009

OTHER PUBLICATIONS

International Search Report and Written Opinion for PCT Application No. PCT/US2022/078813, mailed on Jan. 31, 2023, 10 pages.
(Continued)

*Primary Examiner* — Russell Frejd
*Assistant Examiner* — Brittany Renee Peko
(74) *Attorney, Agent, or Firm* — Brake Hughes Bellermann LLP

(57) ABSTRACT

Sensor data may be received from a plurality of sensors installed on a vehicle and characterizing driving conditions of the vehicle. The sensor data may be continuously stored in a ring buffer implemented using a random access memory (RAM). A recording trigger to record event data related to a driving event of the vehicle may be received. A subset of sensor data may be extracted from the ring buffer, based on the recording trigger. The subset of the sensor data may be recorded in an event file in a second memory.

20 Claims, 5 Drawing Sheets

(51) Int. Cl.
   *G06F 16/00*      (2019.01)
   *G07C 5/08*       (2006.01)
   *H04L 67/12*      (2022.01)

(56)                    References Cited

U.S. PATENT DOCUMENTS

2016/0364921 A1*   12/2016   Iyoda ..................... G07C 5/008
2017/0113664 A1     4/2017   Nix
2018/0215042 A1*    8/2018   Nakayama ............ G06F 3/0683
2018/0270444 A1     9/2018   Nakada
2020/0250902 A1*    8/2020   Golov .................... G07C 5/085
2023/0386277 A1*   11/2023   Golov ..................... G07C 5/08
2024/0262148 A1*    8/2024   Yamamoto ............ B60G 11/113

OTHER PUBLICATIONS

Extended European Search Report for European Application No.
22888509.1, mailed Aug. 12, 2025, 13 pages.

* cited by examiner

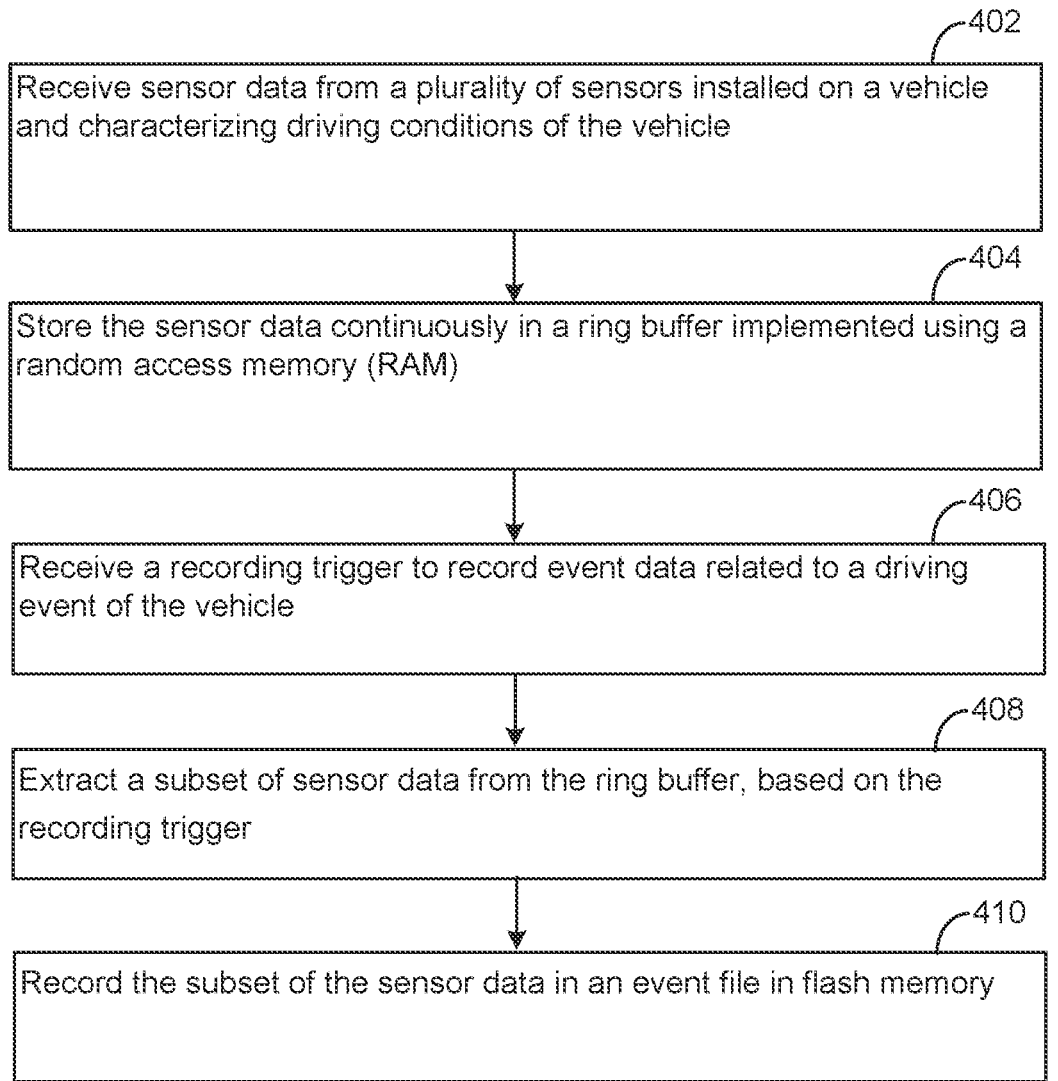

402

Receive sensor data from a plurality of sensors installed on a vehicle and characterizing driving conditions of the vehicle

404

Store the sensor data continuously in a ring buffer implemented using a random access memory (RAM)

406

Receive a recording trigger to record event data related to a driving event of the vehicle

408

Extract a subset of sensor data from the ring buffer, based on the recording trigger

410

Record the subset of the sensor data in an event file in flash memory

Record sensor data in ring buffer in RAM

504

Detect recording trigger

506

Select sensor(s) and duration(s) for recording

508

Determine sensor data location in ring buffer

510

Extract and store sensor data subset in event file

512

Detect upload conditions and update upload queue

514

Upload event file to external network

DATA COLLECTION FOR VEHICLE SENSOR DATA

CROSS-REFERENCE TO RELATED APPLICATION

This application is a 35 U.S.C. § 371 National Phase Entry Application from PCT Application No. PCT/US2022/078813, filed on Oct. 27, 2022, entitled "DATA COLLECTION FOR VEHICLE SENSOR DATA", and designating the U.S., which claims priority to U.S. Patent Application No. 63/263,308, filed on Oct. 29, 2021, and entitled "DATA COLLECTION FOR VEHICLE SENSOR DATA," the disclosures of which are incorporated by reference herein in their entireties.

TECHNICAL FIELD

This description relates to data collection from vehicle sensors.

BACKGROUND

Vehicles, such as automobiles, may acquire vast quantities of data related to operations of the vehicles. For example, vehicles may acquire data from multiple onboard sensors, as well as from external networks. Such data may be used, for example, to help ensure safe operation of a vehicle, and/or to facilitate semi-autonomous or autonomous driving of a vehicle.

Quantities of such data obtained at a vehicle may be extremely large, particularly relative to the computing resources available at the vehicle. It is possible to upload capture data to an external network for remote processing, but vehicle resources available for such uploading may also be limited.

For purposes of ensuring safe and convenient operation of a vehicle, and/or to facilitating semi-autonomous or autonomous driving of a vehicle, it is important to process acquired data in a fast and efficient manner, notwithstanding the large volume of data in question. For example, if vehicle computing resources are consumed to provide sensor data processing and collection, then operations of the vehicle in collecting and processing future sensor data may be constrained, and/or user interactions with the vehicle may be delayed.

Use of flash memory to store captured vehicle data may provide fast write times while consuming fewer processor resources than using external hard drives or solid state drives (SSDs). Flash memory, however, deteriorates with number of writes, which is problematic when considering the large quantities of sensor data being continuously captured.

SUMMARY

According to some general aspects, a computer program product may be tangibly embodied on a non-transitory computer-readable storage medium and may comprise instructions that, when executed by at least one computing device, may be configured to cause the at least one computing device to receive sensor data from a plurality of sensors installed on a vehicle and characterizing driving conditions of the vehicle, and store the sensor data continuously in a ring buffer implemented using a random access memory (RAM). The instructions, when executed by the at least one computing device, may be configured to cause the at least one computing device to receive a recording trigger to record event data related to a driving event of the vehicle, extract a subset of sensor data from the ring buffer, based on the recording trigger, and record the subset of the sensor data in an event file in a second memory.

In example implementations, the second memory includes flash memory. The instructions, when executed by the at least one computing device, may be configured to cause the at least one computing device to identify the recording trigger as including a sensor value of a first sensor of the plurality of sensors, identify, in response to the recording trigger, at least a second sensor of the plurality of sensors, and include sensor data from the first sensor and the at least the second sensor within the subset of sensor data. The instructions, when executed by the at least one computing device, may be configured to cause the at least one computing device to select, in response to the recording trigger, at least one sensor from which to record the subset of sensor data, and designate a start time and end time of recording of the subset of sensor data. The instructions, when executed by the at least one computing device, may be configured to cause the at least one computing device to designate the start time as occurring prior to the recording trigger, capture, from the RAM, a first portion of the subset of sensor data recorded prior to the recording trigger, and capture a second portion of the subset of sensor data recorded in the RAM after the recording trigger, until the end time is reached. The instructions, when executed by the at least one computing device, may be configured to cause the at least one computing device to extract the subset of sensor data by performing a search of the ring buffer for stored sensor data of the at least one sensor matching the start time. The instructions, when executed by the at least one computing device, may be configured to cause the at least one computing device to store the sensor data in the ring buffer having a maximum size, and delete oldest-stored sensor data from the ring buffer when the maximum size is reached and new sensor data is added. The instructions, when executed by the at least one computing device, may be configured to cause the at least one computing device to classify the event file as having an event of an event type related to the driving conditions. The instructions, when executed by the at least one computing device, may be configured to cause the at least one computing device to compress the subset of sensor data, designate the compressed subset of sensor data within an upload queue, and upload the compressed subset of sensor data to an external network, based on the upload queue. The recording trigger may include a sensor value within the sensor data that is outside of a defined range.

According to additional general aspects, a computer-implemented method may include receiving sensor data from a plurality of sensors installed on a vehicle and characterizing driving conditions of the vehicle, and storing the sensor data continuously in a ring buffer implemented using a random access memory (RAM). The method may include receiving a recording trigger to record event data related to a driving event of the vehicle, extracting a subset of sensor data from the ring buffer, based on the recording trigger, and recording the subset of the sensor data in an event file in a second memory.

In example implementations, the second memory may include flash memory. The method may include identifying the recording trigger as including a sensor value of a first sensor of the plurality of sensors, identifying, in response to the recording trigger, at least a second sensor of the plurality of sensors, and including sensor data from the first sensor and the at least the second sensor within the subset of sensor data. The method may include selecting, in response to the recording trigger, at least one sensor from which to record the subset of sensor data, and designating a start time and end time of recording of the subset of sensor data. The method may include designating the start time as occurring prior to the recording trigger, capturing, from the RAM, a first portion of the subset of sensor data recorded prior to the recording trigger, and capturing a second portion of the subset of sensor data recorded in the RAM after the recording trigger, until the end time is reached. The method may include storing the sensor data in the ring buffer having a maximum size, and deleting oldest-stored sensor data from the ring buffer when the maximum size is reached and new sensor data is added. The method may include classifying the event file as having an event of an event type related to the driving conditions.

According to additional general aspects, a vehicle may include a chassis, a frame mounted on the chassis, a motor mounted within the frame, a plurality of sensors mounted on the vehicle and configured to generate sensor data characterizing an environment of the vehicle, at least one memory including instructions, and at least one processor that is operably coupled to the at least one memory and that is arranged and configured to execute the instructions. When executed, the instructions may cause the at least one processor to receive sensor data from the plurality of sensors characterizing driving conditions of the vehicle, and store the sensor data continuously in a ring buffer implemented using a random access memory (RAM). When executed, the instructions may cause the at least one processor to receive a recording trigger to record event data related to a driving event of the vehicle, extract a subset of sensor data from the ring buffer, based on the recording trigger, and record the subset of the sensor data in an event file in a second memory.

In example implementations, the instructions, when executed by the at least one processor, may cause the at least one processor to select, in response to the recording trigger, at least one sensor from which to record the subset of sensor data, and designate a start time and end time of recording of the subset of sensor data. The instructions, when executed by the at least one processor, may cause the at least one processor to store the sensor data in the ring buffer having a maximum size, and delete oldest-stored sensor data from the ring buffer when the maximum size is reached and new sensor data is added.

The details of one or more implementations are set forth in the accompanying drawings and the description below. Other features will be apparent from the description and drawings, and from the claims.

BRIEF DESCRIPTION OF THE DRAWINGS

FIG. 4 is a flowchart illustrating example operations of the systems of FIGS. 1-3.

DETAILED DESCRIPTION

Figure 1:
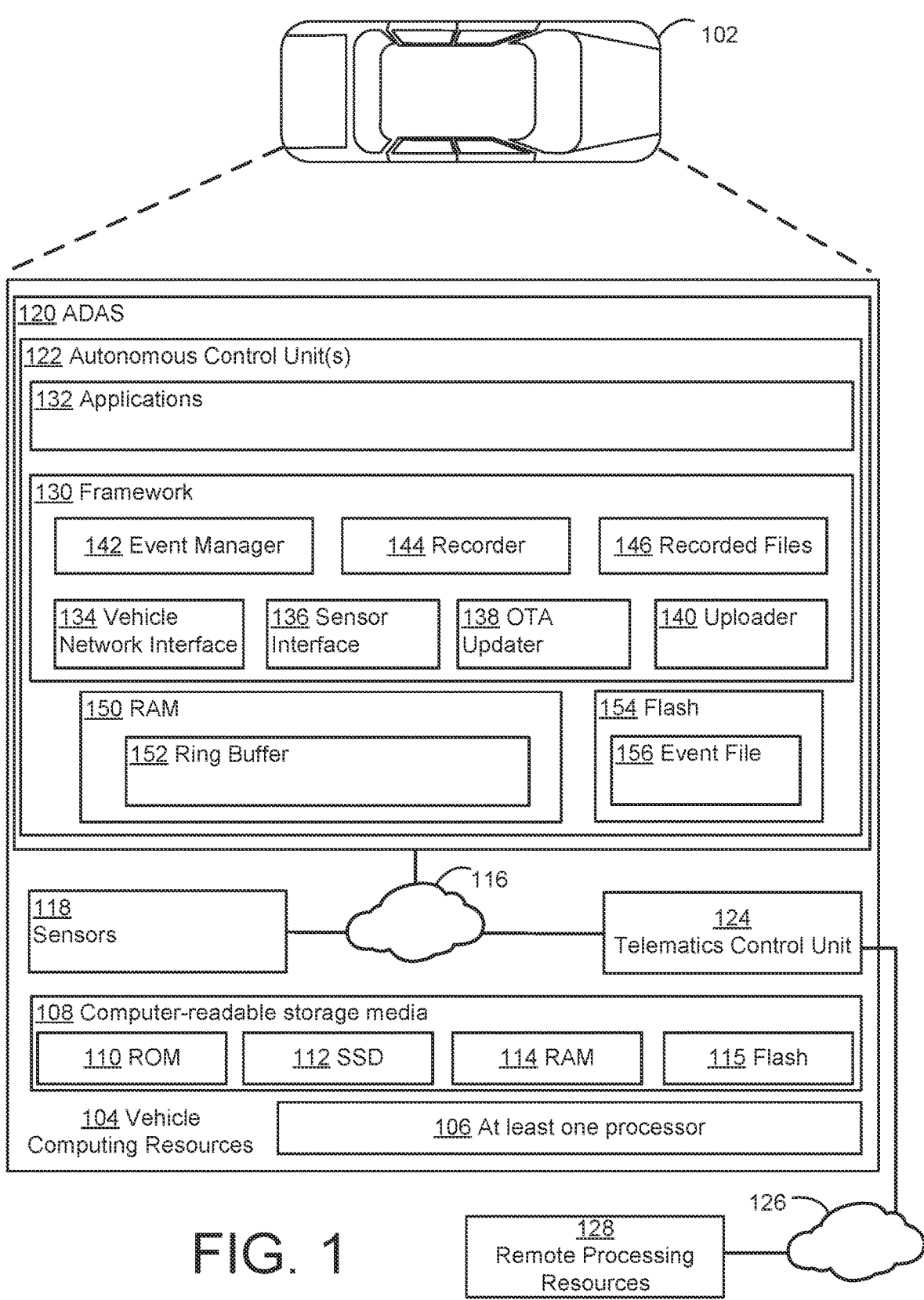
FIG. 1 is a block diagram of a system for collecting and processing driving events.

Described systems and techniques enable fast, accurate, and configurable collection of sensor data related to vehicle driving events of a vehicle. Consequently, it is possible to identify, transmit, and analyze desired subsets of sensor data related to driving events, while continuing to use the same sensor data for primary purposes, such as autonomous driving and control of a vehicle.

The described techniques provide an optimized and efficient framework for recording sensor data from multiple sensors (e.g., cameras or lidar sensors) and vehicle signals to capture events, including data that was captured prior to the event occurring, without excessive writes to flash storage. Accordingly, flash memory and processor usage may be optimized, while storing sensor data and vehicle signal data for events (critical and non-critical) under various driving conditions.

Flash writes may be costly in terms of processor usage, and a lifecycle of flash memory deteriorates with a number of writes executed. Described techniques continuously record sensor data and vehicle signals in individual dedicated buffers in a circular or ring buffer having a maximum size within random access memory (RAM). When generating events of interest, recordings corresponding to events may be created in flash storage by transferring data from circular buffer. This approach allows recording of past and future data, e.g., ranging from a few seconds to a minute or more.

By utilizing limited RAM memory and reducing processor utilization, memory and processor usage is optimized, and a number of memory copies may be reduced. The collected sensor data may be captured efficiently using the RAM to record the event, thereby reducing disk input/output (I/O) and increasing the longevity of flash while reducing processor overhead.

In more detail, as referenced above, it is undesirable at best and infeasible at worst to store or transmit the vast quantities of sensor data collected by sensor-equipped vehicles, particularly considering computing resource constraints of onboard vehicle computing resources. Nonetheless, such sensor data contains potentially valuable information. For example, collected sensor data may be analyzed to improve an accuracy level of (e.g., to train) autonomous driving algorithms. Moreover, sensor data collected around a time of an accident or other driving event may be instrumental in predicting and avoiding accidents and other events in the future. Therefore, it is desirable to capture, transmit, and store minimally sufficient quantities (subsets) of sensor data that are likely to include such valuable information.

Described techniques determine and select event-related data that may be helpful in analyzing driving events and improving a self-driving ability of a vehicle, without disrupting ongoing processing of collected sensor data or concurrent user interactions with vehicle resources, and without requiring large or inefficient quantities of processing or memory resources. Accordingly, the safety and convenience of vehicle drivers and other vehicle users may be enhanced.

In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

The vehicle 102 may thus include a body of desired type (e.g., a chassis, a frame mounted on the chassis with doors, windows, a roof, trunk, and/or hood), various components for enabling movement of the vehicle, such as wheels/wings, and a suitable motor, such as an electric motor (and associated battery) or internal combustion engine (not separately illustrated in FIG. 1). Various types of vehicle computing resources 104, which may include many different types and configurations of hardware and software resources, may also be included. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., read-only memories (ROM) 110, solid state drives (SSD) 112, random access memories (RAM) 114, or flash memories (Flash) 115.

The vehicle computational resources 104 may also include network hardware used to create a vehicle network 116 within the vehicle 102. For example, the vehicle network 116 may represent, e.g., wiring and related hardware/ software to provide one or more busses and related protocols for distributing data within the vehicle 102. As such, the vehicle network 116 provides opportunities for intra-vehicle communication between and among various vehicle subsystems, as described in detail, below.

For example, the vehicle network 116 may utilize existing types of vehicle bus topologies and related busses, including, e.g., the Controller Area Network (CAN) bus, the Local Interconnect Network (LIN) bus, or the Media Oriented Systems Transport (MOST). The network 116 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

In many implementations, the vehicle 102 may include multiple sensors 118, which may be used to detect information regarding an environment or surroundings of the vehicle 102. For example, the sensors 118 may include video cameras, Light Detection and Ranging (lidar) sensors, ultrasonic sensors, radar sensors, GPS sensors, and various other types of sensors. The sensors 118 may be distributed within and around a chassis, body, and/or cabin of the vehicle 102, where needed to perform intended functions.

In the simplified example of FIG. 1, the vehicle computational resources 104, including the at least one processor 106, the non-transitory computer-readable storage medium 108, the vehicle network 116, and the sensors 118, are illustrated together for ease of illustration and description. Within the vehicle 102, however, as already noted with respect to the vehicle network 116 and the sensors 118, multiple pairs or groups of processors and memories may be distributed in desired locations within the vehicle 102, together with other related hardware, to provide intended functionalities.

For example, multiple control boards may be assembled using desired ones of the at least one processor 106 and the computer-readable storage media 108, and positioned appropriately within the vehicle 102 to perform desired functions. Such control boards and related hardware and software may be referred to generally as electronic control units (ECUs). For example, one or more ECUs may be used to support and enable corresponding vehicle subsystems. Examples of current vehicle subsystems may include subsystems for navigation, including an advanced driver assistance system (ADAS) 120 for autonomous or semi-autonomous systems, which may include one or more Autonomous Control Units (ACUs) 122. Various other vehicle subsystems may relate to, or include, subsystems for vehicle safety features, climate control, and information/entertainment (infotainment) systems.

In some implementations, the ACU 122 may represent two or more ACUs, e.g., three ACUs. In such cases, one of the ACUs may be designated as a central ACU of the ADAS 120. Then, communications between various ACU components of the several ACUs may be centralized and coordinated to a desired extent through the central ACU, which may be in communication with the remaining ACUs through the vehicle network 116.

Another example of an ECU is illustrated in FIG. 1 as telematics control unit (TCU) 124. The TCU 124 may represent a single site of network connectivity for connecting the vehicle 102 to external network(s) 126. Maintaining the TCU 124 as a single site of network connectivity may provide efficiency by reducing or eliminating a need to reproduce connectivity components (e.g., hardware modems) at multiple locations, or for multiple vehicle subsystems, within the vehicle 102.

Moreover, maintaining a single site of network connectivity may assist in protecting the vehicle 102 from various types of cyberattacks. For example, the TCU 124 may be equipped with firewalls and various other protection mechanisms used to prevent attackers from, e.g., controlling operations or the vehicle 102, or accessing confidential information within the vehicle 102.

The TCU 124 may include multiple modems and/or related hardware (including appropriate ones of the at least one processor 106 and the computer-readable storage media 108) for connecting to two or more external networks 126. For example, the TCU 124 may provide external connectivity to WiFi networks, long term evolution (LTE) networks, or 3G/4G/5G networks.

Accordingly, it is possible to use the external networks 126 to exchange vehicle information with remote processing resources 128. For example, as described in detail, below, it is possible to perform over-the-air (OTA) updates of software stored using the computer-readable storage media 108, or to upload navigation data from the vehicle 102 to the remote processing resources 128 for analysis or long-term storage.

As further illustrated, the ACU 122 may include a framework 130. The framework may include an operating system (OS) that, e.g., supports operations of one or more applications 132 of the ACU 122, and that enables connectivity with the vehicle network 116. For example, the framework 130 may provide or include an implementation of the Automotive Open Source Architecture (Autosar), which is designed to support deployment of the applications 132 using an operating system based on the Portable OS Interface (POSIX) standard, which is written using C++ and enables service-oriented communication and application programming interfaces (APIs) for communicating with, e.g., the vehicle network 116 and the applications 132. Additionally, or alternatively, the framework 130 may include other OS implementations, such as automotive grade Linux.

In the example of FIG. 1, the framework 130 is illustrated as including a vehicle network interface 134 for communicating with the vehicle network 116. The framework 130 also includes a sensor interface 136, which represents one or more interfaces for obtaining sensor data from the appropriate ones of the sensors 118.

An OTA updater 138 represents a component for receiving updates of the vehicle 102 via the external networks 126. For example, new or updated software may be downloaded via the TCU 124 and installed by the OTA updater 138 within an appropriate or designated memory of the computer-readable storage media 108.

An uploader 140 may be configured to execute any desired transmission of data from the vehicle 102 to the external networks 126, using the vehicle network 116 and the TCU 124. For example, the uploader 140 may be configured to upload processed sensor data, or any vehicle data, to the remote processing resources 128.

An event manager 142 represents a component for detecting, determining, processing, and/or characterizing network data received via the vehicle network interface 134 and/or sensor data received via the sensor interface 136, and for then using the network data and/or sensor data, e.g., to control other functions of the framework 130 and the applications 132. Put another way, the event manager 140 represents a control node for controlling and coordinating operations of the framework 130 and the applications 132, to thereby achieve coordinated functions such as, e.g., sensor fusion, multi-layer perception processing algorithms, and autonomous driving control algorithms for controlling steering, braking, or other functions of the vehicle 102.

In specific examples, the event manager 142 may be configured to control operations of a recorder 144 in recording various types of vehicle data, including sensor data, for storage as recorded files 146. For example, the recorded files 146 may be used to store sensor data related to particular events, including driving-related events such as sudden accelerations/decelerations, or impact events including collisions of the vehicle 102. Then, some or all of the recorded files 146 may be uploaded to the external networks 126, and to the remote processing resources 128, using the uploader 140.

In the simplified example of FIG. 1, the various components or modules 134, 136, 138, 140, 142, 144, 146 of the framework 130 are illustrated as singular, individual modules implemented entirely in the context of the framework 130. In various implementations, however, it will be appreciated that specific features and functions of one or more of the framework modules 134, 136, 138, 140, 142, 144, 146 may be implemented in the context of the applications 132, i.e., as application-layer functions.

As referenced above, sensor data may be used for vehicle control as part of the ADAS 120. For example, processed sensor data may be routed through the vehicle network interface 134 and over the vehicle network 116 to an appropriate ECU for vehicle control. For example, such vehicle control may include steering or braking of the vehicle 102. Accordingly, processed sensor data and related data represents an extremely large volume of high priority data, which must be transmitted and processed quickly and accurately to maintain safe operation of the vehicle 102.

Nonetheless, much of this processed sensor data cannot, or should not, be transmitted or stored for long term use. In particular, quantities of local storage at the computer-readable storage media 108 may be very limited, while quantities of processed sensor data, including perception data (related to correctly perceiving a surrounding environment of the vehicle 102) and vehicle control data, may be generated continuously in vast quantities.

Moreover, there may be little need or motivation to attempt to store much or all of the vehicle control data. For example, the vehicle 102 may travel for a period of time uneventfully, with all sensor and control functionalities occurring as expected. Further, the vehicle 102 may travel for many hours, and the vehicle 102 may represent a many thousands of vehicles, so that it would be impractical, impossible, and undesirable to attempt to store such data either locally at the vehicle 102 and/or using the remote processing resources 128. Still further, attempting to store and analyze large or continuous quantities of vehicle sensor and control data may increase a likelihood of identifying the vehicle 102 uniquely, and thereby compromising a privacy of a user of the vehicle 102.

On the other hand, capturing important and meaningful vehicle events that may occur during use of the vehicle 102 may represent critical opportunities to improve relevant sensor and control (e.g., navigation) algorithms. For example, such event-specific vehicle data may represent, or correspond to, malfunctions or crashes of the vehicle 102.

Other events may relate to unexpected or undesirable driving conditions, such as sudden turns, accelerations, or decelerations. Such events may be correlated with, or caused by, external events, such as hazardous road conditions. In other examples, such events may be cause by driver error or distraction.

By capturing sensor and control data related to such events, the ADAS 120 enables fast, efficient, cost-effective analysis of operations of the vehicle 102, without overwhelming available resources for data storage, transmission, and analysis. As a result, it is possible to continuously improve the vehicle 102, including improvements to vehicle self-navigation and safety of users of the vehicle 102.

For example, in FIG. 1, the ACU 122 is illustrated as including onboard RAM 150, which is used to implement a circular or ring buffer 152. For example, the ring buffer 152 may represent a maximum, fixed (but adjustable) quantity of the RAM 150, e.g., an allocated address space, into which data is inserted and removed in a first-in-first-out (FIFO) manner.

In other words, sensor data from the sensors 118 may be continuously received and stored within the ring buffer 152, until the ring buffer 152 is filled with sensor data. At that point, the oldest sensor data may be deleted or removed from the ring buffer 152, and the newest, currently-available sensor data may be added. This process may continue indefinitely while the vehicle 102 is in operation.

Meanwhile, as described above, the event manager 142 may be configured to determine one or more events that may occur in conjunction with the operation of the vehicle 102. Upon detection of a potential event, the event manager 142 may cause the recorder to 144 to extract related sensor data from the ring buffer 152.

In particular, because the ring buffer 152 records a continuous stream of sensor data as just described, the recorder 144 may be configured to capture past sensor data that preceded the potential event and occurred prior to a trigger to begin capturing event data. The recorder 144 may also extract current and ongoing sensor data recorded using the ring buffer 152 that may be relevant to the event in question.

The recorder 144 may further be configured to write the resulting extracted data to onboard flash memory 154 as an event file 156. The event file 156 may be stored with related event metadata, such as other vehicle signals related to vehicle operations, or relevant network data obtained from the external network(s) 126. The event file 156 may also include event data for multiple events.

Then, the uploader 140 may be configured to execute operations to upload the event file 156 over the external network 126 to the remote processing resources 128. For example, the uploader 140 may be configured to upload a plurality of event files and may assign relative priorities for conducting such uploads. For example, the uploader 140 may assign an order of upload, and may designate one or more modems of the TCU 124 and associated networks (e.g., cellular or WiFi) of external networks 126 for conducting the upload.

Figure 2:
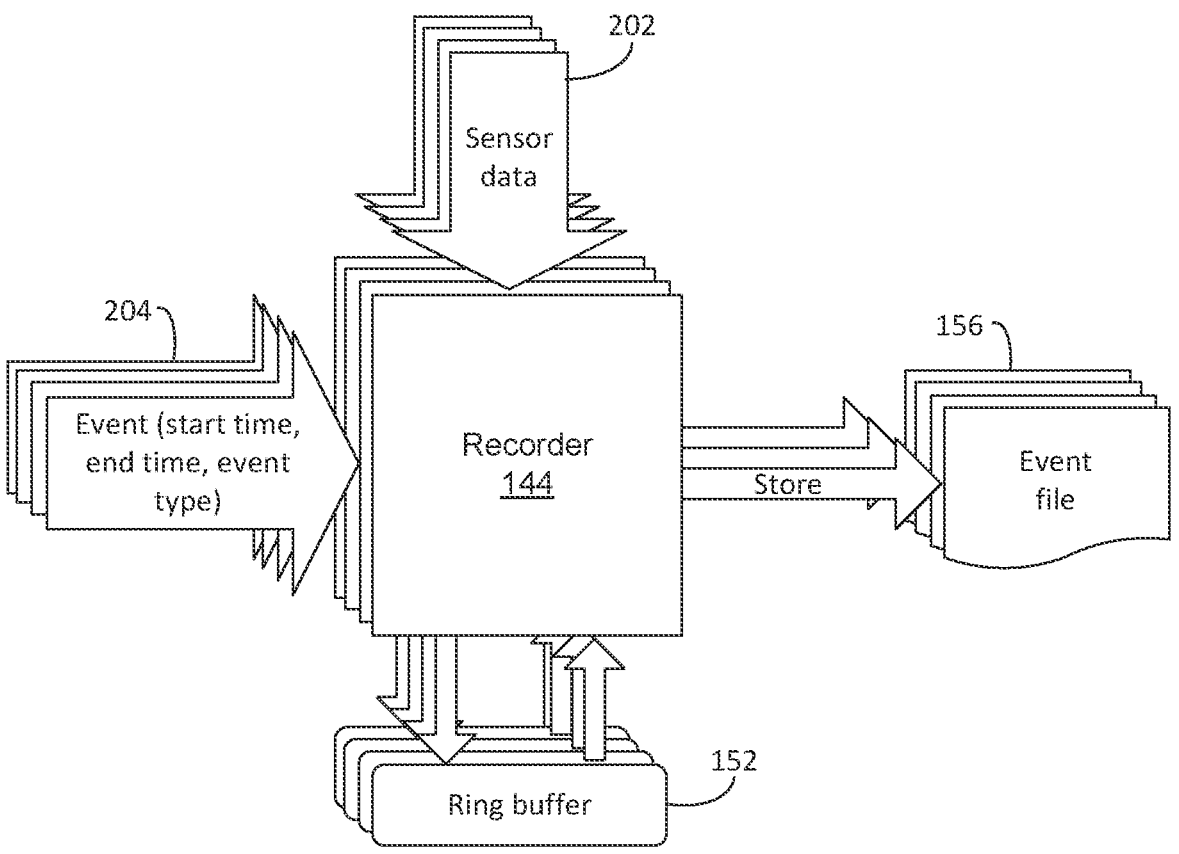
FIG. 2 is a block diagram illustrating a more detailed example of the system of FIG. 1.

As shown in FIG. 2, a sensor data stream 202 may be received from some or all of the sensors 118 and, as referenced above, captured using the recorder 144 to continuously write the data to the ring buffer 152. In FIG. 2, event data 204 from the event manager 142 may identify a start time, end time, and event type of a potential event.

In some examples, although not explicitly illustrated in FIG. 2, the ring buffer 152 may represent a buffer pool and may be assigned specific address spaces and/or individual buffers for specific sensors. For example, a first sensor buffer/location may be allocated to data from a first sensor, sensor A, while a second sensor buffer/location may be allocated to data from a second sensor, sensor B. Of course, as described above, the vehicle 102 may use many sensors, so that it will be appreciated that the ring buffer 152 may include corresponding memory locations for all such sensors. Sensor locations may be allocated, for example, in conjunction with a start or boot operation of the vehicle 102 and/or of the ADAS 120.

The event manager 142 and the recorder 144 may be configured to identify, collect, and classify specific sensor data from the ring buffer 152 that may be related to a specific driving event. Resulting event data may be recorded as an event file 156 within the onboard flash memory 154, as described with respect to FIG. 1, and subsequently uploaded to the remote processing resources 128 using the uploader 140.

Figure 3:
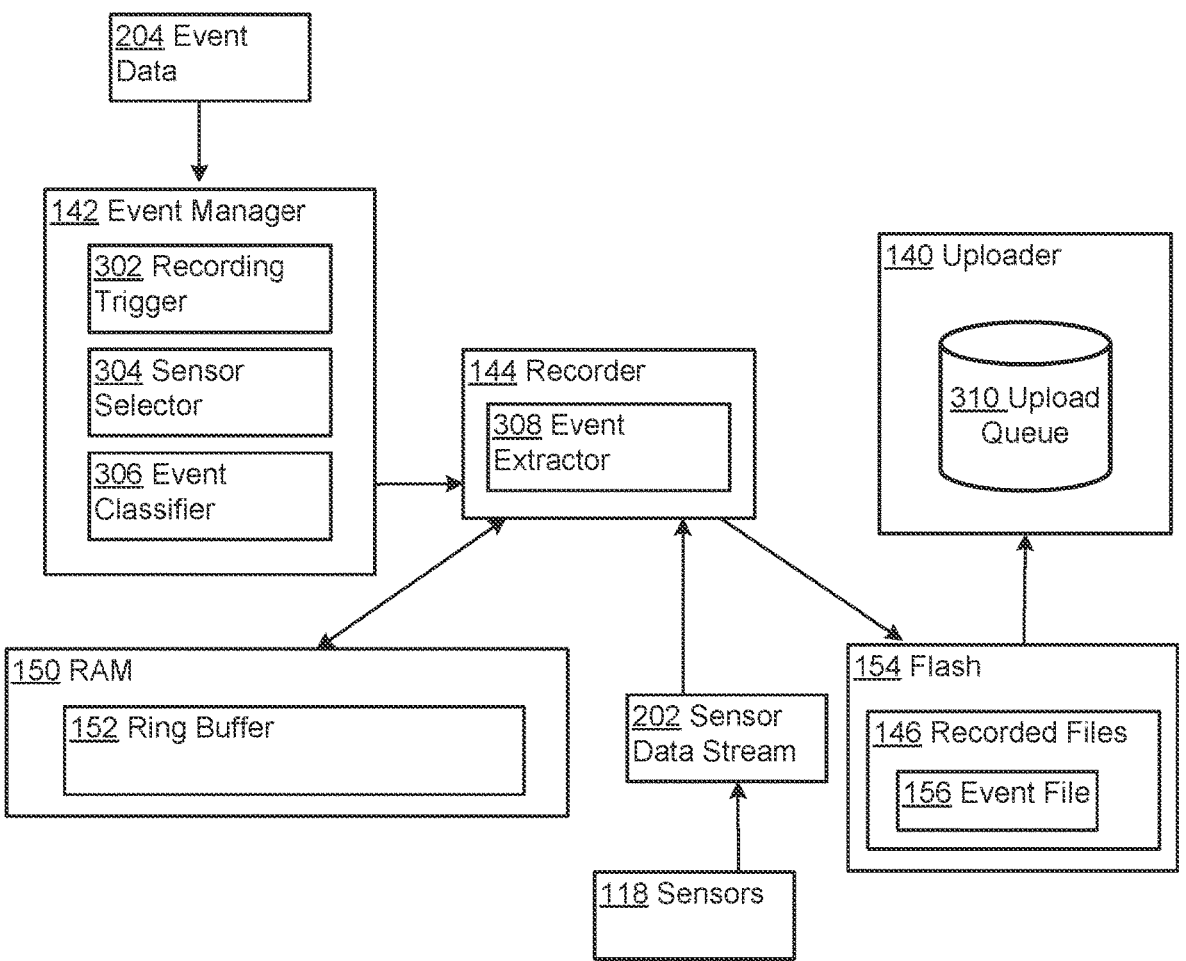
FIG. 3 is a block diagram illustrating a more detailed example of the system of FIG. 2.

More detailed examples are illustrated in FIG. 3. For example, the event manager 142 may receive the event data 204, which may include, or be derived from the sensor data stream 202, if the event manager 142 is provided corresponding access thereto. In other examples, the event data 204 may include various vehicle signals from other vehicle subsystems, or from external sources.

For example, the event data 204 may include information regarding internally monitored vehicle components or systems, such as brakes, steering, or tire pressure. In other examples, the event data 204 may include externally-obtained information, e.g., via the external network(s) 126. For example, the event data 204 may include GPS data, or weather conditions.

The event manager 142 may include a recording trigger 302, which may be configured to analyze the flow of sensor data stream 202 for the plurality of sensors, e.g., as buffered in the ring buffer 152, and identify a potential driving event for which event data should be captured. For example, a recording trigger may include unexpected or unpredicted braking, steering, or other control data, or may include sensor data in the sensor data stream 202.

Once such a recording trigger is identified, a sensor selector 304 may be configured to select data from corresponding sensors from the ring buffer 152, e.g., from corresponding ones of the various sensor locations or individual sensor buffer locations of the ring buffer 152.

For example, the vehicle 102 may include multiple cameras positioned at different locations on and around the vehicle 102, as well as multiple lidar sensors positioned at various other vehicle locations. Therefore, if an event recording trigger is identified in a first camera at a first position on the vehicle 102 (e.g., at a right front corner of the vehicle 102), then the sensor selector 304 may be configured to identify the camera in question and its corresponding sensor location within the ring buffer 152.

Moreover, event type may require that sensor data from at least one other sensor should be captured in conjunction with event data from the identified camera. For example, a lidar sensor (e.g., transceiver) that is positioned at a front of the vehicle 102 may be identified for concurrent collection of lidar sensor data. Then, the sensor selector 304 may be configured to identify a second location within the ring buffer 152, corresponding to the lidar sensor.

In contrast, various other ones of the sensors 118 (e.g., sensors at a rear of the vehicle 102) may be determined to be unlikely to be relevant to the current event. Therefore, sensor data from such sensors in a relevant time frame of the current event may not be identified for collection for the current event.

The sensor selector 304 may be configured to make event-specific determinations as to potential relevance of various sensors, and associated sensor data capture. For example, in the above example, the sensor data from the rear sensors may be collected for a first type of event associated with the right-front camera, but not for a second type of event associated with the right-front camera.

An event classifier 306 may be configured to classify the event and associated subset of sensor data collected. For example, the recording trigger 302 may be configured to collect sensor data that may be associated with multiple types of events, based on a single trigger. For example, a trigger of a sudden braking event might be associated with distracted driving, an actual collision, or both.

The event classifier 306 may execute an event classification of recorded event data. Event classification may be executed with respect to external events, such as a weather at the time of the event. The event classification may also include a start time and end time at which buffered data from the ring buffer should be extracted, e.g., based on the event type. For example, the event type may dictate a duration (e.g., length of time) of sensor data extracted from the ring buffer 152 for the event in question.

For example, the ring buffer 152 may continuously capture a number of minutes of sensor data, such as two minutes, or five minutes. Then, for a specific type of event, the recorder 144 may record a corresponding type and quantity of buffered data, such as a preceding sixty seconds of buffered sensor data together with a subsequent sixty seconds of buffered sensor data that is collected in the sixty seconds following event identification/triggering.

An event extractor 308 may be configured to perform the extraction of identified sensor data from the ring buffer 152. For example, the event extractor 308 may execute a binary search algorithm to extract the identified sensor data.

For example, in addition to searching the ring buffer 152 to identify relevant sensor information as referenced above, the event extractor 308 may account for individual frame boundaries when retrieving data from the ring buffer 152. For example, the sensor data stream 202 may be received as network packets over the vehicle network 116, e.g., as image frames in the case when the sensor is a camera. If the event extractor 308 attempts to acquire data from the ring buffer 152 for a preceding 60 seconds and a succeeding 30 seconds, it may occur that boundary frames do not align exactly with these temporal borders or boundaries. Accordingly, the event extractor 308 may be configured to identify a frame that is closest to the time cut-off, and omit an adjacent frame that is either outside of the cut-off, or that straddles the cut-off. Using these or related techniques, the event extractor 308 may ensure that entire frames are captured by the recorder 144.

The event extractor 308 may also be configured to package one or more events into the event file 156. For example, multiple potentially related events may be captured together, particularly if they overlap in time. In other examples, the event extractor 308 may include various types of event metadata in the event file 156, including some or all of the event data 204 associated with the event.

The recorder 144 may also be configured to control a format or manner of recording of different types of recorded sensor data. For example, the recorder 144 may determine one of multiple video formats for recording a video stream from a camera. In other examples, the recorder 144 may control a type and extent of compression (e.g., different compression algorithms that may be used) of the event file for efficient storage in the event file 156 and subsequent uploading by the uploader 140.

The uploader 140 may be configured to control a timing, manner, and priority of an upload operation of the event file 156, relative to other event files and other data in generally that may need to be uploaded by the uploader 140. For example, the uploader 140 may determine a relative priority of the event file with respect to other event files within an upload queue 310. Relative priority levels may determine, e.g., an order of files within the upload queue 310.

In other examples, priority levels may determine permissible network options for conducting the upload. For example, as described with respect to the TCU 124, the TCU 124 may include multiple modems for connecting to multiple types of networks. Such networks may have different transfer rates and associated costs. Consequently, the uploader 140 may be configured to enable use of faster and/or more expensive external networks 126 for relatively higher priority event files being uploaded.

For example, in the event of a crash, a priority may be assigned that enables immediate (or as soon as possible) event file uploading using the fastest and most expensive network option, in order to ensure a safety of vehicle occupants, or because the crash may have the potential to render the uploader 140 or the TCU 124 inoperable. On the other hand, some events related to sudden acceleration/deceleration may be assigned a low priority, and may only be uploaded when a low cost external network is available.

In the above examples, the ring buffer 152 is described as being implemented in RAM 150, which may reduce CPU demands that may occur, for example, if the sensor data stream 202 were buffered or recorded using the SSD 112, external hard drive, or other memory that requires CPU commands to write and delete data. Such CPU demands might otherwise result in reductions in responsiveness of other applications that rely on the same CPU(s), thereby causing user inconvenience and frustration, as referenced above. By directly processing the sensor data stream 202 using the ring buffer 152 in RAM 150, the buffered sensor data may be accessed very quickly, with minimal CPU usage, and with minimal processing of the buffered data.

FIG. 4 is a flowchart illustrating example operations of the systems of FIGS. 1 and 2. In the example of FIG. 4, operations 402-410 are illustrated as separate, sequential operations. In various implementations, the operations 402-410 may include sub-operations, may be performed in a different order, may include alternative or additional operations, or may omit one or more operations. Further, in all such implementations, included operations may be performed in an iterative, looped, nested, or branched fashion.

In FIG. 4, sensor data may be received from a plurality of sensors installed on a vehicle and characterizing driving conditions of the vehicle (402). For example, the recorder 144 may receive the sensor data stream 202 from the plurality of sensors 118 distributed on the vehicle 102, including, e.g., cameras, lidar sensors, pressure sensors, GPS sensors, accelerometers, or any other sensor referenced herein, or usable with the vehicle 102.

The sensor data may be continuously stored in a ring buffer implemented using a random access memory (RAM) (404). For example, the recorder 144 may store sensor data from the sensor data stream 202 within the ring buffer 152 of the RAM 150.

A recording trigger to record event data related to a driving event of the vehicle may be received (406). For example, the recording trigger may include any information that is internal or external to the vehicle 102, or combinations thereof. For example, a recording trigger may include a particular type or value of a sensor signal from one or more sensors, or combinations thereof, e.g., when the sensor values are outside of an expected range of values. A recording trigger may also include external, such as a weather event or information received via the external network 126.

A subset of sensor data may be extracted from the ring buffer, based on the recording trigger (408). For example, the recorder 144 may extract relevant sensor data within a defined duration (e.g., time window with defined start time and end time). The recorder 144 may identify a sensor associated with a recording trigger, and also identify potential related sensors, and include sensor data of the related sensors in the subset of sensor data.

The subset of the sensor data may be recorded in an event file in a second memory (410), e.g., a flash memory. For example, the recorder 144 may record the subset of sensor data from multiple sensors within the flash memory 154.

Figure 5:
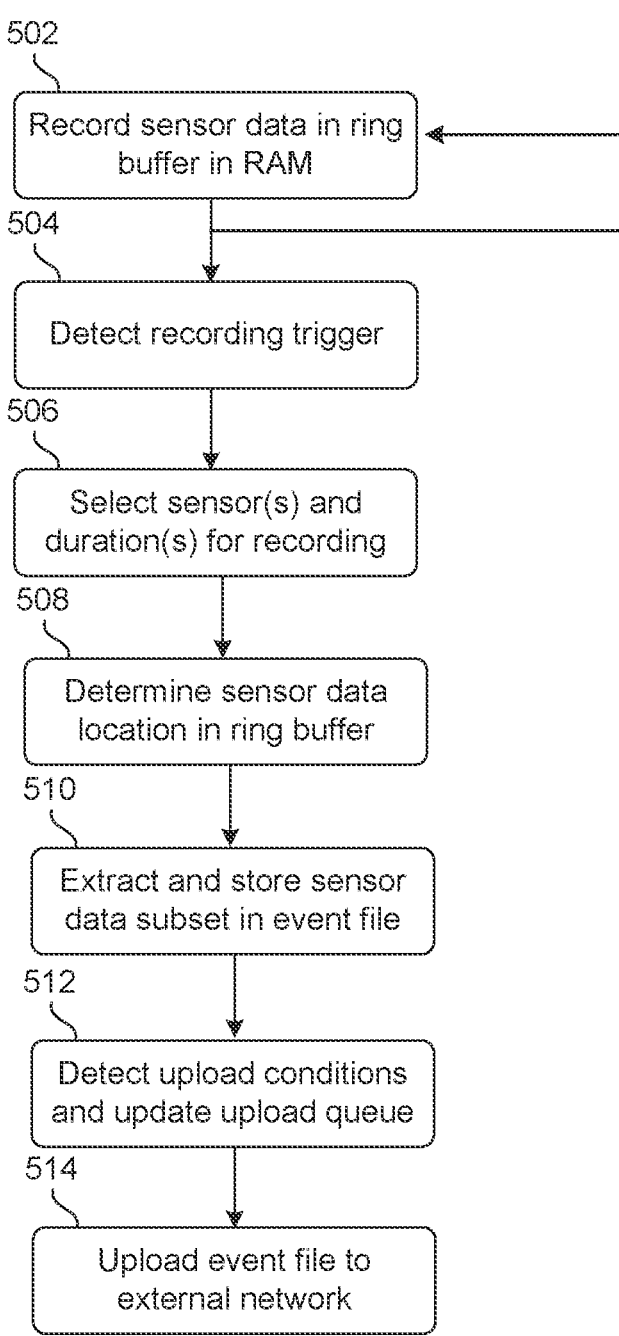
FIG. 5 is a flowchart illustrating more detailed example operations of the flowchart of FIG. 4.

FIG. 5 is a flowchart illustrating more detailed examples of event file capture and processing in the systems of FIGS. 1-3. In the example of FIG. 5, various operations are illustrated as separate, sequential operations. In various implementations, however, the same or similar ones of the operations may include sub-operations, may be performed in a different order, may include alternative or additional operations, or may omit one or more operations. Further, in all such implementations, included operations may be performed in an iterative, looped, nested, or branched fashion.

In FIG. 5, the sensor data stream 202 may be continuously received in the ring buffer 152 in RAM 150 (502). A recording trigger may be detected (504), where, as described, the recording trigger may include any information that is internal or external to the vehicle 102, or combinations thereof. For example, a recording trigger may include a particular type or value of a sensor signal from one or more sensors, or combinations thereof. A recording trigger may also include external, such as a weather event or information received via the external network 126.

In response to the recording trigger, one or more sensors and duration(s) may be selected for recording (506). For example, the event manager 142 may dictate that the particular recording trigger detected requires recording of sensor data from one or more of a particular type of sensor throughout the vehicle 102, or of a combination of sensors positioned at one or more particular location(s) around the vehicle 102.

Accordingly, for the sensor(s) identified, a corresponding sensor data location within ring buffer 152 may be determined (508). For example, referring to FIG. 3, the recorder 144 may perform a search of the ring buffer 152 to determine stored sensor data that most closely matches a start time associated with the requested duration.

A subset of sensor data may be extracted and stored in an event file, e.g., in flash memory (510). For example, the event classifier 306 may classify one or more potential event(s), based on the determined subset of sensor data. For example, the event classifier 306 may relate specific sensor values or ranges to corresponding types of events, perhaps in combination with external factors obtained separately from the sensor data.

It will be appreciated that a recording trigger may be associated with one or more potential events, with varying strengths of correlation. For example, a recording trigger of a significant enough deceleration may be associated with a collision. In such cases, the recording trigger itself may be sufficient to classify an event.

In other examples, a recording trigger may indicate merely a potential for one or more types of events, such as a sudden vehicle movement that could relate to either a driver error and/or poor weather conditions. Therefore, it may not be feasible to classify a potential event until after a corresponding sensor data subset is obtained and analyzed.

A suitable format and/or compression type may be selected for storing the event file 156. For example, based on the type of event classified, a corresponding duration of sensor data may be retrieved. For example, a particular type of event for a recording trigger at time "t" may require collection of a portion of sensor data within a preceding 30 seconds (t–30) of sensor data, together with a subsequent portion of 60 seconds (t+60) of sensor data.

In some implementations, the resulting sensor data obtained may be stored initially in RAM 114 and then stored to SSD 112 for storing the recorded files 146. For example, the ring buffer 152 may record a first duration of sensor data, but various events may require storing at least a second duration of sensor data that is larger than the first duration.

For example, the ring buffer 152 may store 30 seconds or 60 seconds of sensor data in a first-in-first-out (FIFO) or circular manner, so that, once the maximum size of the ring buffer 152 is reached, oldest data is deleted when new data is received. However, event data may require 90 seconds of sensor data, so that the recorder 144 may capture, e.g., an available 30 seconds of sensor data from the ring buffer 152 and then continue to capture a subsequent 60 seconds to obtain the total of 90 seconds of sensor data require for storage within the event file 156.

Upload conditions may be detected and the upload queue may be updated (512). For example, the event manager 142 may designate a priority level for uploading the type of event associated with the event file 156. The priority level may also be contingent on the type or strength of available connection to the external network 126.

The event file may then be uploaded to the external network (514). For example, the event file 156 may be uploaded via the TCU 124 to the external network 126, and thereby to the remote processing resources 128.

In various example implementations of FIGS. 1-5, a data recorder is configured to collect sensor information (Camera, Lidar, Radar Sensors and relevant vehicle data) based on vehicle events, using, e.g., 3 ACUs. The collected sensor data may be stored in the rotated and sorted ring buffer created in the RAM for each sensor. These sensor data may be compressed before storing in the RAM to optimize the space utilized. Stored data in the ring buffer is overwritten after a certain configurable period so that there is limited RAM space occupied. The ring buffer can be designed in such a way that recent data received is added to the tail node in the buffer. Once the ring buffer is full, the recent data is pushed to the tail and the rotation begins.

The recorder can begin recording these data into a file after receiving an event. The event received in the event streams, has start time, end time, and event ID for the recording. Once an event is received the recorder performs an optimized binary search algorithm based on start time in event received to extract data from the ring buffer. The search algorithm returns pointer to ring buffer node with nearest matching start time. Once the search is performed, the recorder starts writing the desired data into a file.

The write to file logic may wait for future data for specified seconds after writing the last node from ring buffer. As soon as the data that matches the event end time is received from ring buffer, the recorder will finish the recording and notify the data uploader module accordingly. The recorder can store metadata along with the data which includes relevant event and sensor information. The recorder is also capable of recording multiple consecutive events in one file.

Described techniques are advantageous, for example, because flash writes are relatively costly, and a lifecycle of flash memory deteriorates with a number of writes performed. The approaches described herein include recording data from sensors and signals in individual dedicated buffers continuously in RAM in a circular or ring buffer. When events of interest are triggered, recordings corresponding to the events are created in flash storage by transferring data from the circular buffer. This allows recording of past and future data ranging, e.g., from a few seconds up to minute or more. The data collected in RAM may be processed in an efficient, optimized way on the RAM itself to capture the event(s), thereby reducing disk I/O and increasing the longevity of flash while reducing CPU overhead.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive sensor data from a plurality of sensors installed on a vehicle and characterizing driving conditions of the vehicle, each sensor of the plurality of sensors assigned to a corresponding memory location within a ring buffer implemented using a random access memory (RAM);

store the sensor data continuously in the ring buffer-implem;

receive a recording trigger to record event data related to a driving event of the vehicle;

associate the recording trigger with a subset of sensors of the plurality of sensors;

search the ring buffer to locate a subset of memory locations therein corresponding to the subset of sensors;

extract a subset of sensor data from the subset of memory locations, to thereby obtain at least some of the event data; and record the event data in an event file in a second memory.

2. The computer program product of claim 1, wherein the second memory includes flash memory.

3. The computer program product of claim 1, wherein the instructions, when executed, are configured to cause the at least one computing device to:

identify the recording trigger as including a sensor value of a first sensor of the plurality of sensors;

identify, in response to the recording trigger, at least a second sensor of the plurality of sensors; and include sensor data from the first sensor and the at least the second sensor within the subset of sensor data.

4. The computer program product of claim 1, wherein the instructions, when executed, are configured to cause the at least one computing device to:

select, in response to the recording trigger, at least one sensor from which to record the subset of sensor data; and designate a start time and end time of recording of the subset of sensor data.

5. The computer program product of claim 4, wherein the instructions, when executed, are configured to cause the at least one computing device to:

designate the start time as occurring prior to the recording trigger;

capture, from the RAM, a first portion of the subset of sensor data recorded prior to the recording trigger; and capture a second portion of the subset of sensor data recorded in the RAM after the recording trigger, until the end time is reached.

6. The computer program product of claim 4, wherein the instructions, when executed, are configured to cause the at least one computing device to:

extract the subset of sensor data by performing a search of the ring buffer for stored sensor data of the at least one sensor matching the start time.

7. The computer program product of claim 1, wherein the instructions, when executed, are configured to cause the at least one computing device to:

store the sensor data in the ring buffer having a maximum size; and delete oldest-stored sensor data from the ring buffer when the maximum size is reached and new sensor data is added.

8. The computer program product of claim 1, wherein the instructions, when executed, are configured to cause the at least one computing device to:

classify the event file as having an event type related to the driving conditions.

9. The computer program product of claim 1, wherein the instructions, when executed, are configured to cause the at least one computing device to:

compress the event file;

designate the compressed event file within an upload queue; and upload the compressed event file to an external network, based on the upload queue.

10. The computer program product of claim 1, wherein the recording trigger includes a sensor value within the sensor data that is outside of a defined range.

11. A computer-implemented method, comprising:

receiving sensor data from a plurality of sensors installed on a vehicle and characterizing driving conditions of the vehicle, each sensor of the plurality of sensors assigned to a corresponding memory location within a ring buffer implemented using a random access memory (RAM);

storing the sensor data continuously in the ring buffer;

receiving a recording trigger to record event data related to a driving event of the vehicle;

associating the recording trigger with a subset of sensors of the plurality of sensors;

searching the ring buffer to locate a subset of memory locations therein corresponding to the subset of sensors;

extracting a subset of sensor data from the subset of memory locations, to thereby obtain at least some of the event data; and recording the event data in an event file in a second memory.

12. The method of claim 11, wherein the second memory includes flash memory.

13. The method of claim 11, comprising:

identifying the recording trigger as including a sensor value of a first sensor of the plurality of sensors;

identifying, in response to the recording trigger, at least a second sensor of the plurality of sensors; and including sensor data from the first sensor and the at least the second sensor within the subset of sensor data.

14. The method of claim 11, comprising:

selecting, in response to the recording trigger, at least one sensor from which to record the subset of sensor data; and designating a start time and end time of recording of the subset of sensor data.

15. The method of claim 14, comprising:

designating the start time as occurring prior to the recording trigger;

capturing, from the RAM, a first portion of the subset of sensor data recorded prior to the recording trigger; and capturing a second portion of the subset of sensor data recorded in the RAM after the recording trigger, until the end time is reached.

16. The method of claim 11, comprising:

storing the sensor data in the ring buffer having a maximum size; and deleting oldest-stored sensor data from the ring buffer when the maximum size is reached and new sensor data is added.

17. The method of claim 11, comprising:

classifying the event file as having an event type related to the driving conditions.

18. A vehicle comprising:

a chassis;

a frame mounted on the chassis;

a motor mounted within the frame;

a plurality of sensors mounted on the vehicle and configured to generate sensor data characterizing an environment of the vehicle;

at least one memory including instructions; and at least one processor that is operably coupled to the at least one memory and that is arranged and configured to execute the instructions that, when executed, cause the at least one processor to:

receive sensor data from the plurality of sensors characterizing driving conditions of the vehicle, each sensor of the plurality of sensors assigned to a corresponding memory location within a ring buffer implemented using a random access memory (RAM);

store the sensor data continuously in the ring buffer;

receive a recording trigger to record event data related to a driving event of the vehicle;

associate the recording trigger with a subset of sensors of the plurality of sensors;

search the ring buffer to locate a subset of memory locations therein corresponding to the subset of sensors;

extract a subset of sensor data from the subset of memory locations, to thereby obtain at least some of the event data; and record the event data in an event file in a second memory.

19. The vehicle of claim 18, wherein the instructions, when executed by the at least one processor, cause the at least one processor to:

select, in response to the recording trigger, at least one sensor from which to record the subset of sensor data; and designate a start time and end time of recording of the subset of sensor data.

20. The vehicle of claim 18, wherein the instructions, when executed by the at least one processor, cause the at least one processor to:

store the sensor data in the ring buffer having a maximum size; and delete oldest-stored sensor data from the ring buffer when the maximum size is reached and new sensor data is added.

* * * * *